F. BALL.
INCUBATOR.
APPLICATION FILED DEC. 13, 1916.

1,275,829.

Patented Aug. 13, 1918.
4 SHEETS—SHEET 1.

Witnesses

Inventor
Francis Ball
By Victor J. Evans
Attorney

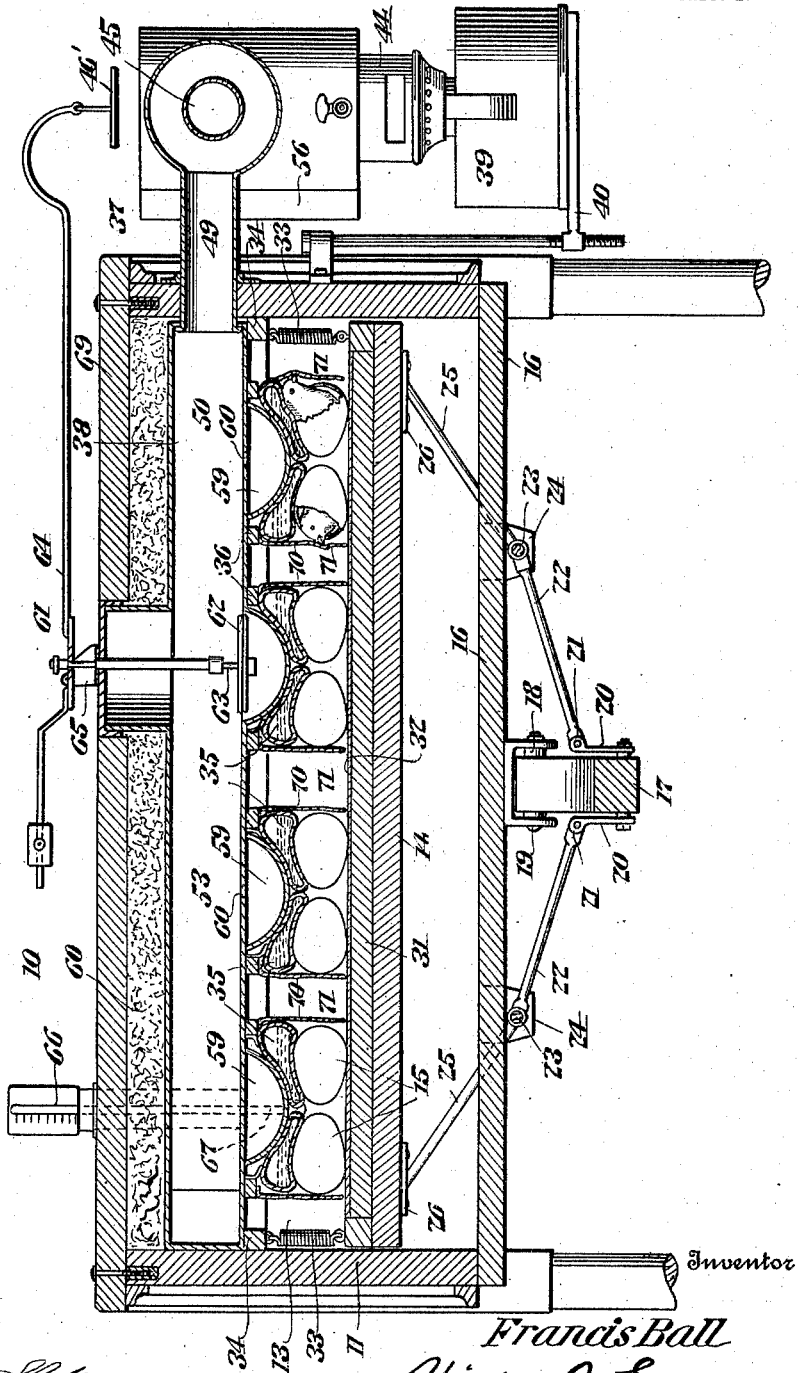

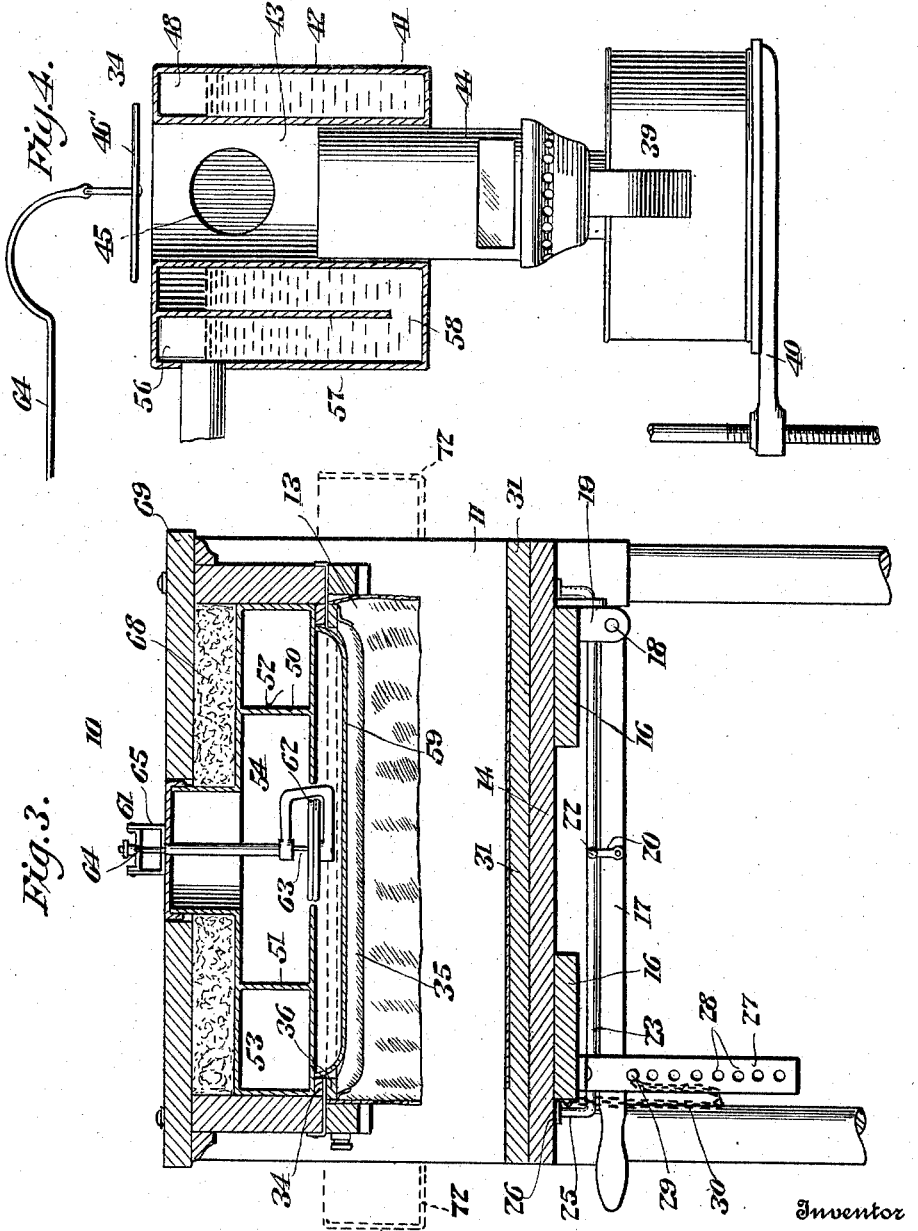

F. BALL.
INCUBATOR.
APPLICATION FILED DEC. 13, 1916.
1,275,829.
Patented Aug. 13, 1918.
4 SHEETS—SHEET 4.
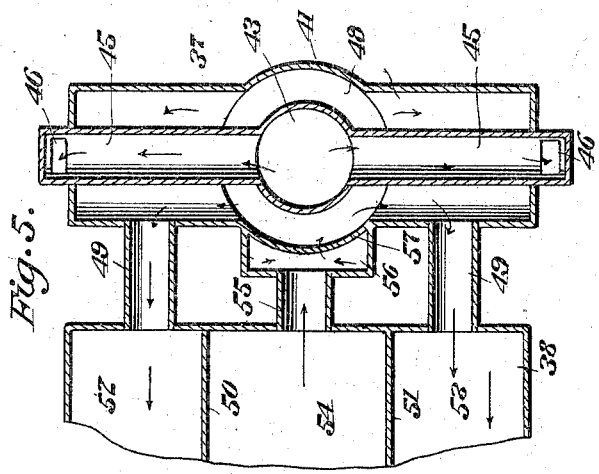
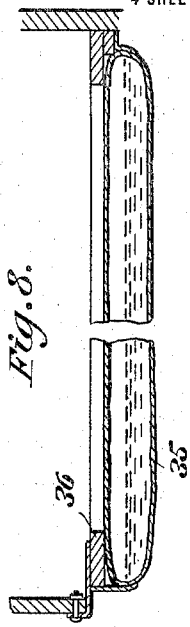
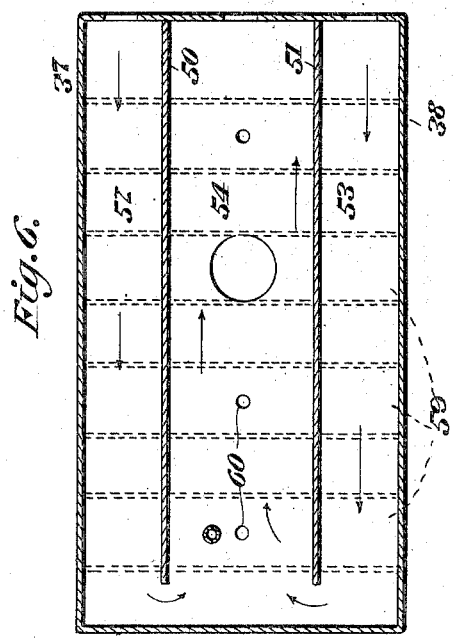
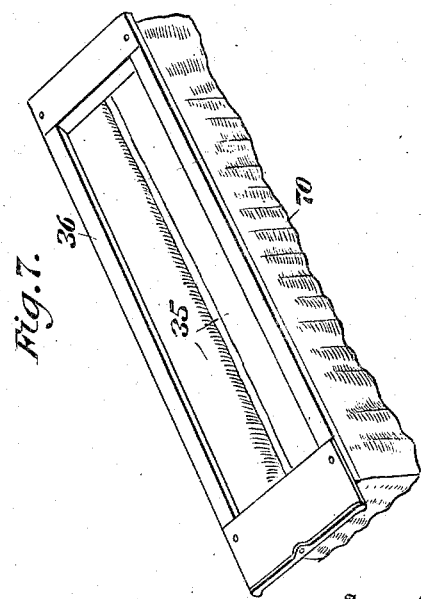
Witnesses
Inventor
Francis Ball
By Victor J. Evans
Attorney

UNITED STATES PATENT OFFICE.

FRANCIS BALL, OF GLENSIDE, PENNSYLVANIA.

INCUBATOR.

1,275,829.  Specification of Letters Patent.  Patented Aug. 13, 1918.

Application filed December 13, 1916. Serial No. 136,764.

*To all whom it may concern:*

Be it known that I, FRANCIS BALL, a citizen of the United States, residing at Glenside, in the county of Montgomery and State of Pennsylvania, have invented new and useful Improvements in Incubators, of which the following is a specificatiton.

This invention relates to incubators, and has for an object to produce an incubator wherein is provided improved means for transmitting heat to eggs positioned therein.

Another object of the invention resides in an incubator having a plurality of flexible heating elements arranged in direct contact with the eggs carried by the incubator, in order that the process of egg incubation will be expedited and accomplished in a more efficient and thorough manner.

A further object resides in an incubator having a vertically movable tray for the reception of eggs, said tray being capable of being moved into or out of engagement with the flexible contact heating elements of the incubator.

A still further object resides in an incubator embodying an improved water-heating and circulating system, and in an improved method of transmitting the heat of the water-circulating system to the incubating eggs.

Other objects will be in part obvious and in part pointed out hereinafter.

With these and other objects in view, the invention consists in the construction, combination and arrangement of parts, set forth in and falling within the scope of the appended claims.

In the drawings wherein is illustrated one of the preferred forms of the present invention, Figure 1 is a perspective view of an incubator constructed in accordance with principles of the invention.

Fig. 2 is a vertical longitudinal sectional view thereof.

Fig. 3 is a transverse sectional view.

Fig. 4 is a vertical sectional view disclosing the heat elements construction.

Fig. 5 is a fragmentary horizontal sectional view through a portion of the water-circulating system or tank.

Fig. 6 is a similar view on a smaller scale of the incubator containing tank in full.

Fig. 7 is a detailed perspective view of the flexible egg heating elements, and

Fig. 8 is a sectional view of the egg heating elements.

Figure 1:
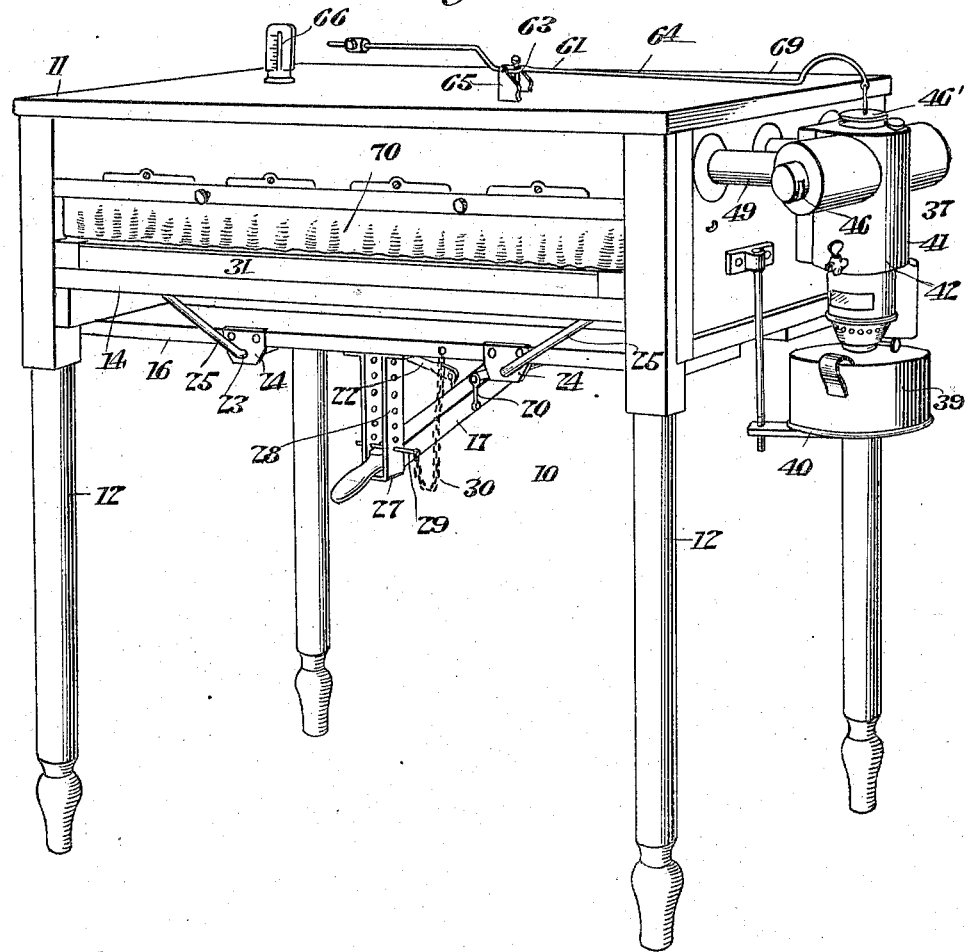
Figure 9:
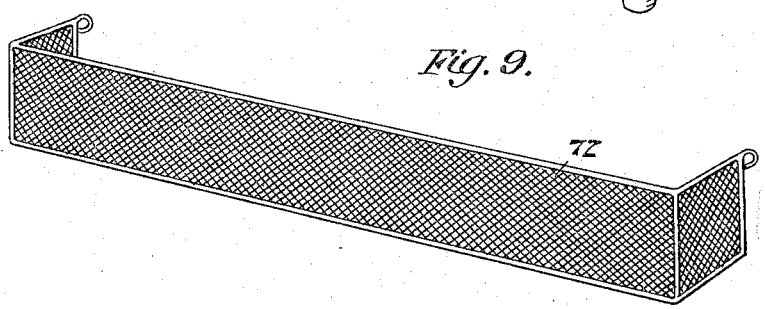
Fig. 9 is a detailed perspective view of the guard or rail member.

Referring more particularly to the drawings the incubator 10, comprising a preferred form of the present invention, consists of a suitable frame 11, which is mounted upon supporting legs 12, the interior of the frame being formed to provide an incubating chamber 13. Vertically movable within the chamber 13 is an egg-supporting tray 14, which is substantially equal to the cross sectional area of the chamber 13, and eggs 15 are adapted to be positioned upon the tray for purpose of incubation. Normally the tray 14 rests upon a plurality of stationary cross bars 16 secured to the lower portions of the frame 11, and when in this position the eggs 15 can be readily placed upon the tray or removed therefrom as desired.

As stated before, the tray is movable within the chamber 13, and to accomplish this function use is made of the plurality of articulated levers which embody a manually operated lever 17, pivoted as at 18 upon one of the cross bars 16, through the medium of a suitable bearing 19. Pivotally mounted upon the central portions of the lever 17 are movable arms 20, which are pivotally connected as at 21 to diverging crank arms 22 fixed upon rock shafts 23, the latter being journaled in suitable bearings 24 carried by the cross bars 16. Thus the oscillation of the lever 17 will result in revolving the rock shafts 23 in their bearings, as will be clearly understood. The outer extremities of the rock shafts are provided with crank portions 25 which extend upwardly, and frictionally engage with the metallic wear plates 26, fixed upon the lower surfaces of the tray 14. Thus it will be seen that the rotation of the rock shafts through the medium of the lever 17 will result in either raising or lowering the tray 14 for purposes to be hereinafter set forth. In order to retain the tray 14 in its raised or lowered positions, the lever 17 is adapted to oscillate within a U-shaped bracket 27 preferably fixed upon one of the cross bars 16, the bracket is provided with a plurality of alined aperatures 28 which are adapted to receive a pin 29 carried by a flexible chain 30. By use of the chain and pin connection, positions of the lever 17 may be readily retained so as to prevent undue movement on the part of the tray 14.

The tray 14 is generally provided with a removable egg-receiving plate 31, which is covered with a suitable fabric 32, which is adapted to have a cushioning effect upon the eggs carried by the tray. The plate 31 is removable in order to facilitate the insertion or removal of eggs from the incubator, and also to retain the tray in a sanitary condition. Springs 33 are secured to the sides of the tray 14 and to stationary cleats 34 secured to the frame 11, said springs being adapted to govern and to insure an even movement of the tray 14, while the latter is being raised or lowered.

Referring now to one of the most essential features of the present invention, the same consists of a plurality of parallel extending, flexible, fluid-containing egg-heating elements 35, the latter being preferably formed of rubber or other waterproof material, and are adapted to be approximately half filled with a suitable fluid. The elements 35 have their extremities suitably secured to brackets 36 rigidly fastened to the frame 11, so that the bags will be disposed within the heating chamber 13, in a position just above the eggs 15 when the tray 14 is elevated. It will be noted that when in this position, the heating elements or bags 35 will surround and engage with the upper surfaces of the eggs carried by the tray 14, so that the heat of the elements 35 will be directly transmitted to the eggs in a manner closely similar to that accomplished by nature. By reason of the flexible nature of the elements 35, it will be noted, as shown in Fig. 2, that when the young fowls begin to break free of the eggs, their movement will not be restricted in any manner by the heating elements, but on the other hand, the fowls may readily shift or change their position without being cramped or hindered in any manner by the action of the heating elements.

In order to impart heat to the elements 35, I preferably use a water-circulating and heating system 37, which in its preferred embodiment consists of a horizontally arranged tank 38, adapted to be positioned within the chamber 13, and is supported by the cleats 34. A lamp or other suitable heating element 39 is adapted to be positioned upon an adjustable bracket 40 located exteriorly of the frame 11. The chimney of the lamp is adapted to extend within a water-heating casing 41, also located outside of the frame 11. The casing 41 preferably consists of a cylindrical portion 42, which is adapted to receive a suitable quantity of water or other fluid, and it will be noted that the heat emitted by the lamp 39 will be concentrated upon this body of water so as to regulate the temperature of the latter. The casing 41 is provided with a central opening 43 into which the chimney 44 of the lamp 39 extends, and the central opening 43 terminates in horizontally extending opposed branch openings 45, which have their outer ends open to the atmosphere. The upper end of the opening 43 is usually closed by means of a damper 46', so that the heat arising from the chimney 44 will be confined within the casing 41, so that its entire effect may be concentrated upon the water contained within the latter. The openings 46 formed in the outer extremities of the branch openings 45 are so situated that atmospheric drafts cannot reach the lamp 39 so as to affect combustion taking place within the latter. The portions 42 of the casing 41 are adapted to surround the openings 43 and 45 so as to provide water-containing jackets 48, which form part of the water-circulating system 37. When water is heated within the jackets 48 the same will pass out of the latter by way of horizontally extending tubes 49, which lead into the tank 38, arranged above the egg-heating elements 35.

As shown in Fig. 6 the tank 38 is divided longitudinally by plates 50 and 51, forming water channels 52, 53 and 54. Thus the water passing from the casing 41 to the tubes 49 will enter the channels 52 and 53, as indicated by the arrows in Fig. 6 and after traversing the channels the same will enter the large channel 54, and will flow toward the casing 41. The water circulates out of the channel 54 by passing into a short pipe section 55, located between the tubes 49, and enters a jacket 56 formed within the casing 41, said jacket 56 being separated from the jackets 48 by partition or wall 57, the latter being provided with an opening 58 contiguous to its lower extremity. It will be noted that by the time the water reaches the jacket 56, the same will be in a somewhat cool condition, and the partition 57 is provided so as to direct this cool water to the lower portions of the jackets 48, where it may be reheated by the action of the lamp 39. It will of course be understood that deviation may be made from the construction of the tank 38, if necessary the same may be formed of a plurality of connected tubes instead of the tank formation as disclosed in the drawing.

Extending transversely across the lower surface of the tank 38 are a plurality of water conduits 59, into which water is discharged through openings 60 formed in the bottom of the tank 38, however, the water-circulating system of the tank 38 does not affect the condition of the fluid contained within the conduits 59, that is, as far as the circulation of water is concerned; however, the temperature of the water within the conduits 59 will be substantially the same as that within the channels 52, 53 and 54, by reason of the adjacent location of the conduits 59 with respect to said channels. By reference to Fig. 2 it will be noted that the conduits 59 are substantially semi-circular in cross section and are so disposed as to directly contact or engage with the heating elements 35, which serve to transmit heat to the tray-carried eggs. Thus it will be obvious that the chief function of the heating elements 35 is merely to transmit heat to the eggs 15, and to permit newly hatched fowls to have a certain amount of freedom breaking out of the shells of the eggs. Otherwise, the conduits 59 could be placed in direct contact with the eggs 15.

In conjunction with the lamp 39 of the heating system 37, I employ the usual heat-controlling thermostat 61, which consists of the usual expanding wafers 62 that are located substantially within one of the conduits 59. In the event of the water within the conduits reaching too high a temperature, the wafer 62 will expand in the usual manner so as to elevate a rod 63, the latter extending upwardly through the tank 38, and out of the frame 11. The upper extremity of the rod 63 is fixed to an oscillating arm 64, which is pivotally secured to a fixed bracket 65. By reason of the fact that the rod 63 is eccentrically secured to the arm 64 with respect to its pivotal point, it will be noted that the elevation of the rod 63 will result in rocking the arm 64 so as to lift the damper 46, which is connected therewith. Thus the lifting of the damper will uncover the opening 43 so that the heat emitted by the lamp 39 will pass off into the atmosphere instead of being concentrated upon the water within the jackets 48, and will thereby lower the temperature of the water, until the latter becomes sufficiently cool to permit the thermostat 61 to return to its normal condition so as to close the damper 46'. A thermometer 66 has its base or bowl 67 in contact with the heating elements 35, so that the temperature of the latter may be readily determined from the exterior of the incubator. Suitable heat insulating material 68 covers the tank 38, so that the heat of the latter will be directed downwardly upon the eggs contained within the chamber 13. A removable top 69 is provided upon the frame 11 so that the mechanism within the chamber 13 may be readily accessible, and for purpose of repair or alteration. The rows of eggs carried by the tray 14 are bound by feather or fabric curtains 70, which define aisle ways 71 between the eggs, the aisle ways being formed in order that newly hatched fowls may gain access to the exterior of the chamber 13, and to escape from the relatively higher temperature of the latter. Wire guards or railings 72 may be readily attached to the sides of the frame 11, at a position in alinement with the tray 14 when the latter is elevated, so as to permit the fowls to exercise outside of the casing 11.

In conclusion, attention is particularly invited to the fact that in an incubator comprising the present invention, the use of hot-air heating chambers has been entirely abolished, and that through the use of the heating elements 35 above described, a far more satisfactory method of transmitting heat to the eggs has been devised. My improved method closely resembles as near as mechanically possible, the actions and conditions of a hen, when employed in hatching eggs, and it has been found from actual tests that the percentage of fowls which live after having been incubated, is far greater from my system than that hitherto employed. By virtue of the movable tray 14' the positions of the eggs carried thereby may be readily changed during the incubation process in a simple and definite manner, this being accomplished by a simple manipulation of the lever 17. The heating elements 35 are preferably formed of pure india rubber in order that the fluid contained therein cannot escape or evaporate.

From the foregoing, when taken in connection with the accompanying drawings, it is thought that the operation and construction of the present invention will be readily understood, therefore a more extended explanation has been accordingly omitted.

Having described the invention what is claimed as new and patentable is:

1. In an incubator, an egg containing chamber, a tank adapted to contain a quantity of fluid capable of being heated supported in said chamber and provided on the bottom thereof with spaced conduits to act upon the eggs, a tray movably supported within the incubator, and curtains secured within the incubator at a point below the tank and at opposite sides of the conduits for providing between the conduits aisle-ways.

2. In an incubator, a tank containing a fluid capable of being heated, conduits below the tank and having openings communicating therewith, brackets on the tank one surrounding each of the conduits, depending curtains on the sides and ends of the brackets providing egg chambers, heat transmitting elements supported on the brackets and contacting with the outer surfaces of the conduits, and a removable egg receiving plate below the egg chambers.

3. In an incubator, a tank containing a heated fluid, spaced transverse conduits formed on the bottom of the tank, said tank having openings communicating with the conduits, substantially rectangular brackets secured to the bottom face of the tank and surrounding the respective conduits, depending curtains on the sides and ends of each of the brackets providing an egg chamber therebetween and aisles between the respective egg chambers, a tray below the egg chambers, a removable egg supporting plate thereon and a fabric facing for said plate.

In testimony whereof I affix my signature.

FRANCIS BALL.

Copies of this patent may be obtained for five cents each, by addressing the "Commissioner of Patents, Washington, D. C."